US009460690B2

United States Patent
Roh et al.

(10) Patent No.: US 9,460,690 B2
(45) Date of Patent: Oct. 4, 2016

(54) TOUCH SCREEN DISPLAY

(71) Applicant: Samsung Display Co., Ltd., Yongin, Gyeonggi-do (KR)

(72) Inventors: Jae-Du Roh, Yongin (KR); Jin-Tae Jeong, Yongin (KR); Chang-Ho Lee, Yongin (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/502,833

(22) Filed: Sep. 30, 2014

(65) Prior Publication Data

US 2015/0097808 A1    Apr. 9, 2015

(30) Foreign Application Priority Data

Oct. 4, 2013    (KR) .......................... 10-2013-0118336

(51) Int. Cl.
| | | |
|---|---|---|
| G09G 5/18 | (2006.01) | |
| G06F 3/047 | (2006.01) | |
| G06F 3/044 | (2006.01) | |
| G06F 3/041 | (2006.01) | |

(52) U.S. Cl.
CPC .................. *G09G 5/18* (2013.01); *G06F 3/044* (2013.01); *G06F 3/0412* (2013.01); *G06F 3/0418* (2013.01)

(58) Field of Classification Search
None
See application file for complete search history.

(56) References Cited

U.S. PATENT DOCUMENTS

| | | | | |
|---|---|---|---|---|
| 2013/0293498 A1* | 11/2013 | Kim | ...................... | G06F 3/0412 345/173 |
| 2014/0111466 A1* | 4/2014 | Kim | ...................... | G06F 3/044 345/174 |
| 2014/0184534 A1* | 7/2014 | Lee | ...................... | G06F 3/044 345/173 |
| 2014/0240279 A1* | 8/2014 | Hwang | ................... | G06F 3/044 345/174 |
| 2015/0169128 A1* | 6/2015 | Hwang | ............... | G02F 1/13338 349/12 |

FOREIGN PATENT DOCUMENTS

| | | |
|---|---|---|
| KR | 10-2009-0107640 A | 10/2009 |
| KR | 10-2010-0108492 A | 10/2010 |

* cited by examiner

*Primary Examiner* — Joseph Haley
*Assistant Examiner* — Emily Frank
(74) *Attorney, Agent, or Firm* — Knobbe, Martens, Olson & Bear, LLP

(57) ABSTRACT

A touch screen display is disclosed. In one aspect, the touch screen display includes a plurality of first touch electrodes each including first and second ends opposing each other and a plurality of second touch electrodes crossing the first touch electrodes. The touch screen display also includes a first voltage line providing a voltage, a first signal line providing a touch driving signal, and a plurality of first switching units respectively connected to the first touch electrodes. Each of the first switching units is electrically connected to the first voltage line, the first signal line, and the first end of a corresponding first touch electrode. Each of the first switching units alternately provides one of the voltage and the touch driving signal to the corresponding first touch electrode.

19 Claims, 5 Drawing Sheets

TOUCH SCREEN DISPLAY

CROSS-REFERENCE TO RELATED APPLICATIONS

This application claims priority to and the benefit of Korean Patent Application No. 10-2013-0118336, filed on Oct. 4, 2013, in the Korean Intellectual Property Office, the entire contents of which are incorporated herein by reference in their entirety.

BACKGROUND

1. Field

The described technology generally relates to a touch screen display.

2. Description of the Related Technology

A touch screen display is a device which displays images and simultaneously receives input from a user by detecting contact between the display and a user's hand, an object, or the like.

Since touch screen displays do not require a separate input device such as a keyboard or mouse, the applications for these devices have been gradually expanding.

SUMMARY OF CERTAIN INVENTIVE ASPECTS

One inventive aspect is a touch screen display, including a plurality of first touch electrodes, a plurality of second touch electrodes arranged in a direction intersecting the first touch electrode, a first voltage line positioned in one region of the first touch electrode to provide a first voltage, a first signal line positioned in the one region to provide a touch driving signal, and a plurality of first switching units each connected to the first voltage line and the first signal line to alternately provide the first voltage and the touch driving signal to one end of each first touch electrode.

The first switching unit may include a first output node connected to the one end of the first touch electrode, first and second transistors connected in parallel between the first output node and the first voltage line, and third and fourth transistors connected in series between the first signal line and the first output node.

The on-off of the first transistor may be controlled by a first control signal, the on-off of the second transistor may be controlled by a second control signal, the on-off of the third transistor may be controlled by a third control signal, and the on-off of the fourth transistor may be controlled by a fourth control signal.

The first and third control signals may be in a mutually inverse relationship and the second and fourth control signals may be in a mutually inverse relationship.

The first switching unit may supply the first voltage to the first touch electrode during first, second and fourth periods, and supply the touch driving signal to the first touch electrode during a third period.

During the first period, the first and second transistors may be turned on, and the third and fourth transistors may be turned off. During the second period, the second and third transistors may be turned on, and the first and fourth transistors may be turned off. During the third period, the third and fourth transistors may be turned on, and the first and second transistors may be turned off. During the fourth period, the first and fourth transistors may be turned on, and the second and third transistors may be turned off.

The one end of each first touch electrode may be adjacent to the one region.

The touch screen display may further include a second voltage line positioned in the other region of the first touch electrode to provide the first voltage, a second signal line positioned in the other region to provide the touch driving signal, and a plurality of second switching units each connected to the second voltage line and the second signal line to alternately supply the first voltage and the touch driving signal to the other end of each first touch electrode.

The second switching unit may include a second output node connected to the other end of the first touch electrode, fifth and sixth transistors connected in parallel between the second output node and the second voltage line, and seventh and eighth transistors connected in series between the second signal line and the second output node.

The on-off of the fifth transistor may be controlled identically to that of the first transistor, the on-off of the sixth transistor may be controlled identically to that of the second transistor, the on-off of the seventh transistor may be controlled identically to that of the third transistor, and the on-off of the eighth transistor may be controlled identically to that of the fourth transistor.

The other end of each first touch electrode may be adjacent to the other region.

The first and second switching units connected to the same first touch electrode may have a supply period of the touch driving signal identical to that of the first voltage.

The first touch electrode may be connected to each emission layer of pixels positioned on at least one row.

The first and second touch electrodes may be formed of a transparent conductive material.

Another aspect is a touch screen display, comprising: a plurality of first touch electrodes each including first and second ends opposing each other; a plurality of second touch electrodes crossing the first touch electrodes; a first voltage line configured to provide a voltage; a first signal line configured to provide a touch driving signal; and a plurality of first switching units respectively connected to the first touch electrodes, wherein each of the first switching units is electrically connected to i) the first voltage line, ii) the first signal line, and iii) the first end of a corresponding first touch electrode and wherein each of the first switching units is configured to alternately provide one of the voltage and the touch driving signal to the corresponding first touch electrode.

In the above display, each of the first switching units comprises: a first output node connected to the first end of the corresponding first touch electrode; first and second transistors connected in parallel between the first output node and the first voltage line; and third and fourth transistors connected in series between the first signal line and the first output node. The above display further comprises first to fourth control signals respectively configured to control the first to fourth transistors. In the above display, the first and third control signals have a mutually inverse relationship and wherein the second and fourth control signals have a mutually inverse relationship.

In the above display, each of the first switching units is configured to apply i) the voltage to the first touch electrode during first, second, and fourth periods, and ii) the touch driving signal to the first touch electrode during a third period. In the above display, the first and second transistors are configured to be turned on and the third and fourth transistors are configured to be turned off during the first period, wherein the second and third transistors are configured to be turned on and the first and fourth transistors are configured to be turned off during the second period, wherein the third and fourth transistors are configured to be turned on and the first and second transistors are configured to be turned off during the third period, and wherein the first and fourth transistors are configured to be turned on and the second and third transistors are configured to be turned off during the fourth period.

In the above display, the first voltage line, the first signal line, and the first switching units are formed in a first region adjacent to the first ends of each of the first touch electrodes. The above display further comprises: a second voltage line configured to provide the voltage; a second signal line configured to provide the touch driving signal; and a plurality of second switching units respectively connected to the first touch electrodes, wherein each of the second switching units is electrically connected to i) the second voltage line, ii) the second signal line, and ii) the second end of the corresponding first touch electrode, wherein each of the second switching units is configured to alternately provide one of the voltage and the touch driving signal to the corresponding first touch electrode.

In the above display, each of the second switching units includes: a second output node connected to the second end of the corresponding first touch electrode; fifth and sixth transistors connected in parallel between the second output node and the second voltage line; and seventh and eighth transistors connected in series between the second signal line and the second output node. In the above display, the first to fourth control signals are respectively configured to control the fifth to eighth transistors. In the above display, the second voltage line, the second signal line, and the second switching units are formed in a second region adjacent to the second ends of the first touch electrodes.

In the above display, each of the first and second switching units connected to the same first touch electrode is configured to provide i) the first voltage at substantially the same time and ii) the first touch driving signal at substantially the same time. The above display further comprises a plurality of pixels arranged in a plurality of rows, wherein each pixel comprises an emission layer and wherein each of the first touch electrodes is connected to the emission layer of each of the pixels arranged in the same row. In the above display, the first and second touch electrodes are formed at least partially of a transparent conductive material.

Another aspect is a touch screen display, comprising: a plurality of pixels arranged in a plurality of rows; a plurality of first touch electrodes each formed over the pixels in at least one row; a plurality of second touch electrodes crossing the first touch electrodes; and a plurality of first switches respectively electrically connected to the first touch electrodes, each first switch configured to alternately apply one of a voltage and a touch driving signal to a corresponding first touch electrode.

The above display further comprises a plurality of second switches respectively electrically connected to the first touch electrodes, wherein each of the second switched is configured to alternately apply one of the voltage and the touch driving signal to the corresponding first touch electrode. The above display further comprises: a voltage line configured to provide the voltage; and a signal line configured to provide the touch driving signal, wherein each of the first switches is connected to the voltage line and the signal line.

Another aspect is a touch screen display, comprising: a plurality of touch electrodes each including first and second ends opposing each other; and a plurality of first switches respectively electrically connected to the first ends of the touch electrodes, wherein each of the first switches is configured to alternately apply one of a voltage and a touch driving signal to a corresponding touch electrode.

The above display further comprises a plurality of second switches respectively electrically connected to the second ends of the touch electrodes, wherein each of the second switched is configured to alternately apply one of the voltage and the touch driving signal to the corresponding touch electrode.

In the above display, each of the first and second switches connected to the same touch electrode is configured to provide i) the voltage at substantially the same time and ii) the touch driving signal at substantially the same time.

DETAILED DESCRIPTION OF CERTAIN INVENTIVE EMBODIMENTS

Figure 1:
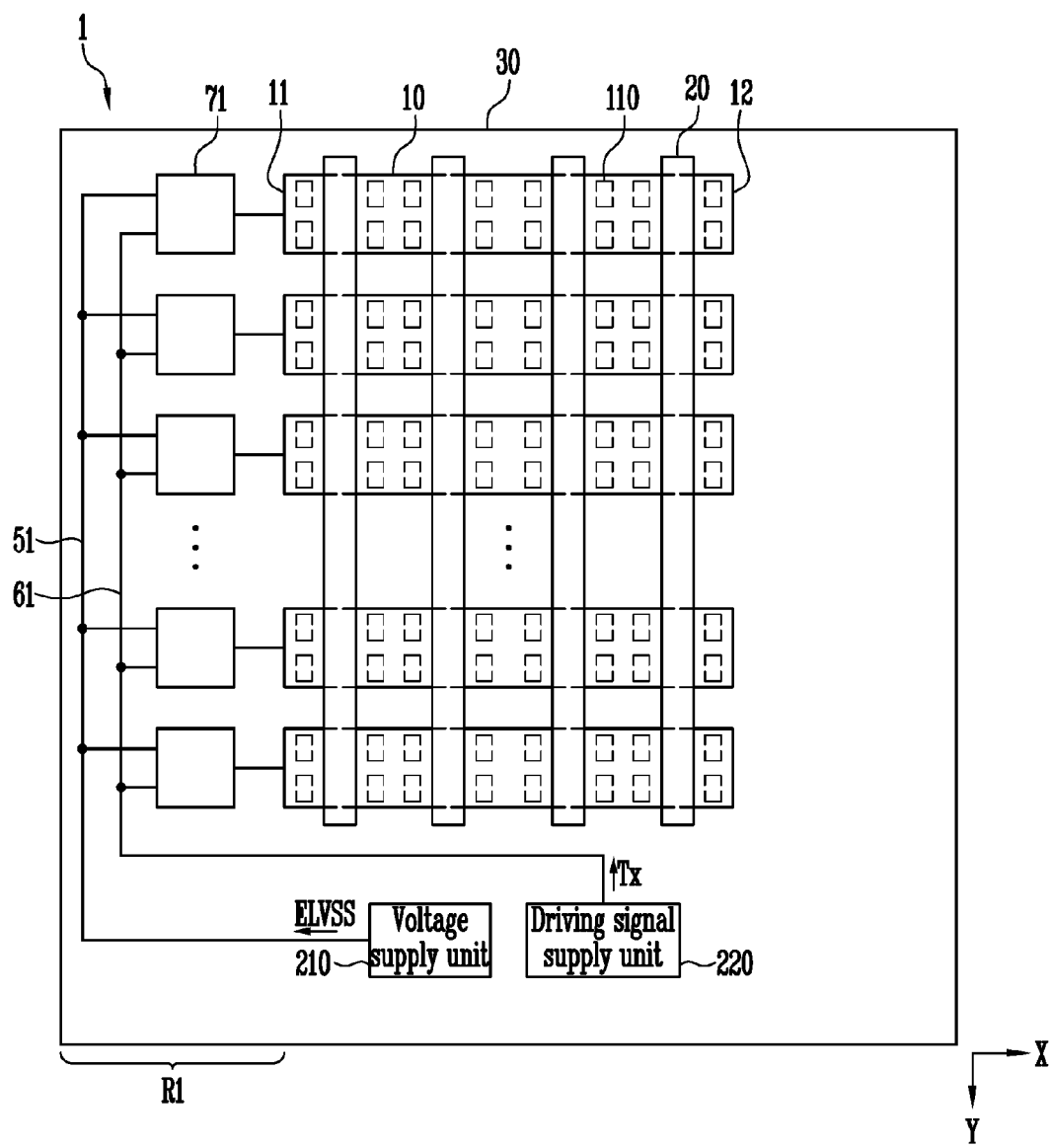
FIG. 1 is a view illustrating a touch screen display according to an embodiment.

The standard method of manufacturing a touch screen display includes separately producing a display and a touch sensor and then attaching the touch sensor to the display. However, this method requires forming the touch sensor separately from the display. Accordingly, the method is inefficient in terms of the manufacturing time and the associated cost. Further, the touch sensor is also required to be attached to and integrated with the display by an additional process.

Hereinafter, certain exemplary embodiments will be described with reference to the accompanying drawings. Here, when a first element is described as being coupled or connected to a second element, the first element may be not only directly coupled or connected to the second element but may also be indirectly coupled or connected to the second element via a third element. Further, some of the elements that are not essential to the complete understanding of the described technology are omitted for clarity. Also, like reference numerals refer to like elements throughout.

FIG. 1 is a view illustrating a touch screen display according to an embodiment.

Referring to FIG. 1, the touch screen display 1 includes a first touch electrode 10, a second touch electrode 20, a first voltage line 51, a first signal line 61, and a first switching unit 71.

The first touch electrode 10 may include a plurality of first touch electrodes spaced apart from each other.

For example, the first touch electrode 10 is formed with a length in a first direction (e.g., an X-axis direction) so that a plurality of first touch electrodes can be arranged in a second direction (e.g., a Y-axis direction) crossing the first direction.

The first touch electrode 10 may be formed of various conductive materials. For example, the first touch electrode 10 can be formed of a transparent conductive material so that the light emitted from an emission layer 110 is transmitted through the first touch electrode 10. However, the first touch electrode 10 may be formed of another conductive material such as an opaque metal.

The first touch electrode 10 may be formed of indium tin oxide (TTO), indium zinc oxide (IZO), graphene, carbon nanotube, silver nanowires (AgNWs), etc.

The first touch electrode 10 may receive a first voltage ELVSS and a touch driving signal Tx from the first switching unit 71.

The second touch electrode 20 is formed spaced apart from the first touch electrode 10. Accordingly, the first and second touch electrodes 10 and 20 together can be driven as a capacitive touch sensor.

To this end, the second touch electrode 20 may be formed in a direction crossing the first touch electrode 10.

In the configuration of FIG. 1, the second touch electrode 20 is formed with a length in the second direction (e.g., the Y-axis direction) so that a plurality of second touch electrodes can be arranged in the first direction (e.g., the X-axis direction).

Thus, a mutual capacitance exists between the first and second touch electrodes 10 and 20 and a touch input position can be detected by measuring a change in capacitance between the electrodes due to a touch input.

In the embodiment of FIG. 1, the second touch electrode 20 is formed of a transparent conductive material. However, according to other embodiments, the second touch electrode 20 is formed of another conductive material such as an opaque metal.

The second touch electrode 20 may be formed of ITO, IZO, graphene, carbon nanotube, AgNWs, etc.

Where the second touch electrode 20 is formed of an opaque metal in order to increase touch sensitivity by lowering resistance, the second touch electrode 20 is formed to not overlap the emission layer 110.

The first voltage line 51 is formed in one region or a first region R1 adjacent to the first touch electrode 10.

According to some embodiments, the first voltage line 51 provides the first voltage ELVSS to the first switching unit 71.

To this end, the first voltage line 51 is electrically connected to a voltage supply unit 210 and receives the first voltage ELVSS from the voltage supply unit 210.

The voltage supply unit 210 generates the first voltage ELVSS and outputs the first voltage ELVSS to the first voltage line 51. For example, the voltage supply unit 210 may be implemented as a DC-DC converter or the like.

The first signal line 61 may be formed in the one region R1 together with the first voltage line 51.

According to some embodiments, the first signal line 61 provides the touch driving signal Tx to the first switching unit 71.

To this end, the first signal line 61 is electrically connected to a driving signal supply unit 220 and receives the touch driving signal Tx from the driving signal supply unit 220.

The driving signal supply unit 220 generates the touch driving signal Tx and supplies the touch driving signal Tx to the first signal line 61.

The first switching unit 71 is connected to the first voltage line 51 and the first signal line 61 and alternately provides the first voltage ELVSS and the touch driving signal Tx to one end or a first end 11 of each first touch electrode 10.

The one end 11 of each of the first touch electrodes 10 is adjacent to the one region R1 in which the first voltage line 51 and the first signal line 61 are formed.

The first switching unit 71 may be formed in the one region R1 of the first touch electrode 10. For example, the first switching unit 71 may be formed between the lines 51 and 61 and the first touch electrode 10.

The standard touch screen display does not include the first switching unit 71, thus the number of signal lines equals the number of the first touch electrodes 10 in order to individually apply the touch driving signal Tx to each first touch electrode 10.

However, according to at least one embodiment, the touch driving signal Tx can be individually applied to the first touch electrode 10 through the control of the first switching unit 71. Thus, unnecessary signal lines can be reduced and it is thus possible to decrease the area of dead space in the touch screen display 1.

Figure 2:
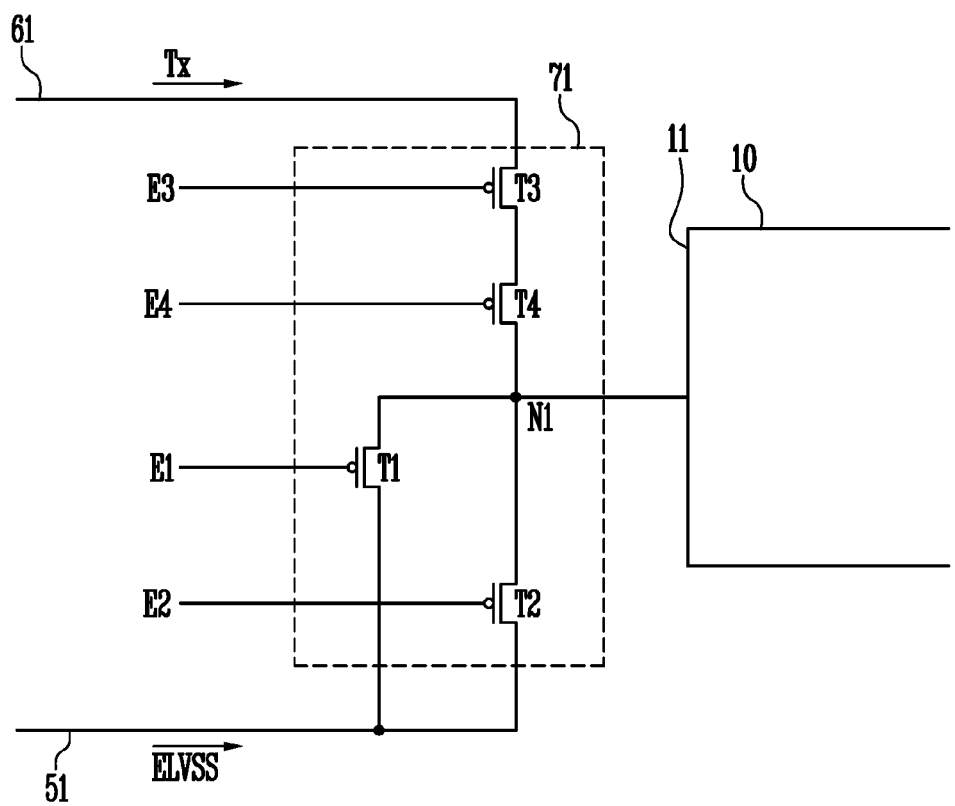
FIG. 2 is a view showing a first switching unit shown in FIG. 1.
Figure 3:
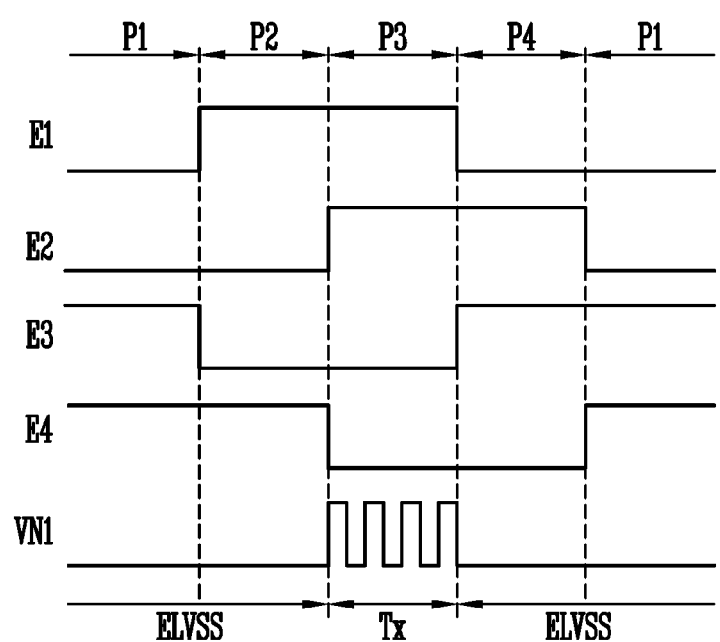
FIG. 3 is a waveform diagram illustrating the operation of the first switching unit.

FIG. 2 is a view showing the first switching unit shown in FIG. 1. FIG. 3 is a waveform diagram illustrating the operation of the first switching unit.

Referring to FIG. 2, the first switching unit 71 includes a first output node N1, a first transistor T1, a second transistor T2, a third transistor T3 and a fourth transistor T4.

The first output node N1 may be electrically connected to the one end 11 of the first touch electrode 10.

The first and second transistors T1 and T2 may be connected in parallel between the first output node N1 and the first voltage line 51.

In the configuration of FIG. 2, the first transistor T1 is controlled by a first control signal E1 and the second transistor T2 is controlled by a second control signal E2.

A first electrode of the first transistor T1 is connected to the first output node N1 and a second electrode of the first transistor T1 is connected to the first voltage line 51. The first control signal E1 is supplied to a gate electrode of the first transistor T1.

A first electrode of the second transistor T2 is connected to the first output node N1 and a second electrode of the second transistor T2 is connected to the first voltage line 51. The second control signal E2 is supplied to a gate electrode of the second transistor T2.

The third and fourth transistors T3 and T4 may be connected in series between the first signal line 61 and the first output node N1.

In the configuration of FIG. 2, the third transistor T3 is controlled by a third control signal E3 and the fourth transistor T4 is controlled by a fourth control signal E4.

A first electrode of the third transistor T3 is connected to the first signal line 61 and a second electrode of the third transistor T3 is connected to the fourth transistor T4. The third control signal E3 is supplied to a gate electrode of the third transistor T3.

A first electrode of the fourth transistor T4 is connected to the third transistor T3 and a second electrode of the fourth transistor T4 is connected to the first output node N1. The fourth control signal E4 is supplied to a gate electrode of the fourth transistor T4.

Referring to FIG. 3, the first switching unit 71 alternately supplies the first voltage ELVSS and the touch driving signal Tx to the first touch electrode 10 connected thereto.

According to the embodiment of FIG. 3, the switching unit 71 supplies the first voltage ELVSS to the first touch electrode 10 during first, second and fourth periods P1, P2 and P4. The switching unit 71 supplies the touch driving signal Tx to the first touch electrode 10 during a third period P3.

To this end, during the first period P1, the first and second transistors T1 and T2 are turned on and the third and fourth transistors T3 and T4 are turned off.

Thus, the first voltage ELVSS can be applied to the first output node N1 during the first period P1. VN1 illustrated in FIG. 3 refers to the voltage of the first output node N1.

During the second period P2, the second and third transistors T2 and T3 are turned on and the first and fourth transistors T1 and T4 are turned off.

Thus, the first voltage ELVSS can be applied to the first output node N1 during the second period P2.

During the third period P3, the third and fourth transistors T3 and T4 are turned on and the first and second transistors T1 and T2 are turned off.

Thus, the touch driving signal Tx can be applied to the first output node N1 during the third period P3.

During the fourth period P4, the first and fourth transistors T1 and T4 are turned on and the second and third transistors T2 and T3 are turned off.

Thus, the first voltage ELVSS can be applied to the first output node N1 during the fourth period P4.

The first period P1 may be repeated after the fourth period P4.

As shown in FIG. 3, the first and third control signals E1 and E3 have a mutually inverse relationship and the second and fourth control signals E2 and E4 have a mutually inverse relationship.

Figure 4:
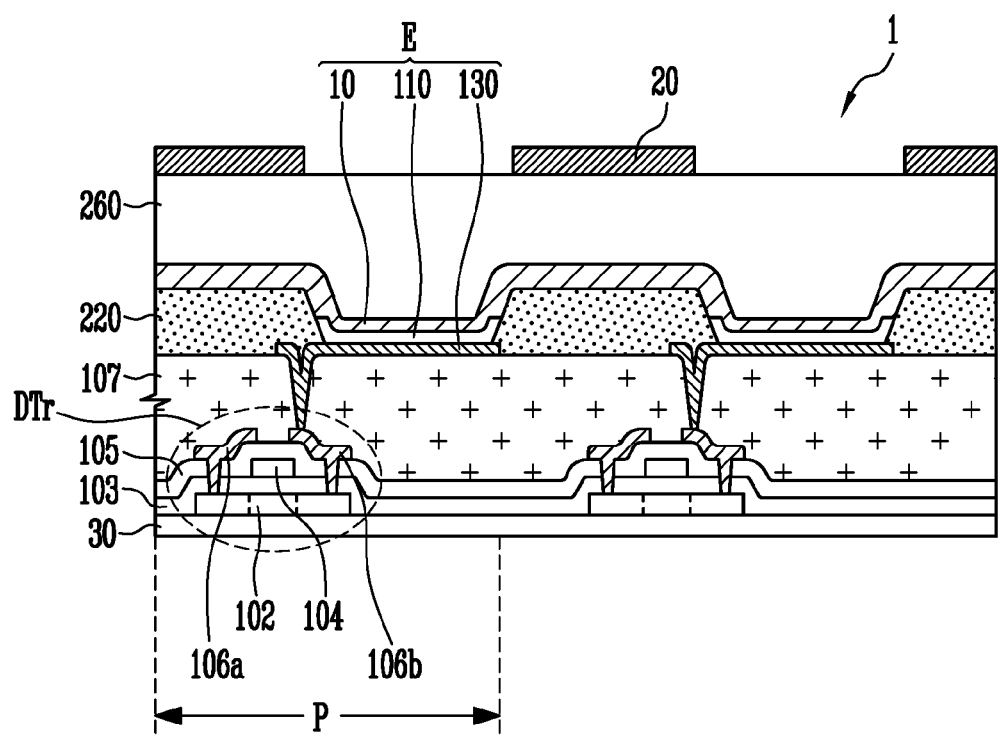
FIG. 4 is a main portion sectional view of the touch screen display shown in FIG. 1.

FIG. 4 is a main portion sectional view of the touch screen display shown in FIG. 1.

Referring to FIG. 4, the touch screen display 1 includes a substrate 30, a plurality of pixels P formed on the substrate 30, and a plurality of second touch electrodes 20 formed to be spaced apart from the pixel P at a predetermined distance.

The substrate 30 may be formed of a material having an electrical insulation property, such as glass, plastic, silicon or synthetic resin.

The substrate 30 may be a film having flexibility to be bendable or foldable.

The pixel P may be configured with a pixel circuit (not shown) including a driving transistor Dtr and an emission device E. The pixels P may be formed on the substrate 30.

For convenience of illustration, only the driving transistor Dtr directly related to the emission device has been illustrated in FIG. 4. However, in order to control emission of the emission device E, the pixel circuit (not shown) may be additionally provided with another transistor, a capacitor and the like, in addition to the driving transistor Dtr.

The driving transistor Dtr is formed on the substrate 30 and may be formed in an area corresponding to each emission device E.

Referring to FIG. 4, the driving transistor Dtr includes a semiconductor layer 102, a gate insulating layer 103, a gate electrode 104, an interlayer insulating layer 105, and source/drain electrodes 106a and 106b.

The semiconductor layer 102 may be formed in a predetermined pattern on the substrate 30.

The semiconductor layer 102 may be formed of polysilicon obtained by crystallizing amorphous silicon deposited on the substrate 30, using laser or the like.

In addition to the polysilicon, the semiconductor layer 102 may be formed of amorphous silicon, oxide semiconductor or the like.

A buffer layer (not shown) may be formed between the substrate 30 and the semiconductor layer 102.

The buffer layer (not shown) is used to prevent the diffusion of impurities contained in the substrate 30 to the semiconductor layer 102. The buffer layer may be formed of an electrically insulating material such as silicon oxide (SiOx) or silicon nitride (SiNx).

The gate insulating layer 103 may be formed on the semiconductor layer 102.

The gate insulating layer 103 may be made of an electrically insulating material such as silicon oxide or silicon nitride.

The gate electrode 104 may be formed in a predetermined pattern on the gate insulating layer 103. The interlayer insulating layer 105 may be formed on the gate electrode 104.

Like the gate insulating layer 103, the interlayer insulating layer 105 may be formed of a predetermined electrically insulating material.

The gate insulating layer 103 electrically insulates the semiconductor layer 102 from the gate electrode 104 and the interlayer insulating layer 105 electrically insulates the gate electrode 104 from the source/drain electrodes 106a and 106b.

The source/drain electrodes 106a and 106b may be formed on the interlayer insulating layer 105. The source/drain electrodes 106a and 106b may be respectively electrically connected to both sides of the semiconductor layer 102 through contact holes formed in the gate insulating layer 103 and the interlayer insulating layer 105.

The gate electrode 104 and the source/drain electrodes 106a and 106b may be formed of a metal such as molybdenum (Mo), tungsten (W), titanium (Ti) or aluminum (Al), or an alloy or stacked structure thereof. However, the described technology is not limited thereto.

The driving transistor Dtr is not limited to the structure shown in FIG. 4, and may be changed into another structure.

A planarization layer 107 is formed on the interlayer insulating layer 105 and the source/drain electrodes 106a and 106b. The planarization layer 107 may be formed of any one of nitride and oxide, but the described technology is not limited thereto.

A via hole may be formed in the planarization layer 107 so that a predetermined portion of the source or drain electrode 106a or 106b is exposed therethrough. A pixel electrode 130 is connected to the source or drain electrode 106a or 106b through the via hole and is formed on the planarization layer 107.

The pixel electrode 103, together with the emission layer 110 and the first touch electrode 10, forms the emission device E.

A pixel defining layer 220 is formed on the planarization layer 107 so that at least one region of the pixel electrode 103 is exposed therethrough.

Accordingly, a plurality of pixel electrodes 130 are divided and exposed by the pixel defining layer 220.

The pixel defining layer 220 may be made of any one of an acrylic organic compound or an organic insulating material such as polyamide or polyimide. However, the described technology is not limited thereto. That is, the pixel defining layer 220 may be formed of various electrically insulating materials.

The pixel electrodes 130 exposed by the pixel defining layer 220 may be formed of various conductive materials.

An emission layer 110 may be formed on the pixel electrode 130 exposed through the pixel defining layer 220.

The emission layer 110 includes an organic emission layer having self-luminescence.

According to some embodiments, the emission layer 110 is formed having a structure in which a hole transporting layer, an organic emission layer and an electron transporting layer are laminated. The emission layer 280 may further include a hole injection layer and an electron injection layer.

The first touch electrode 10 may be formed on the emission layer 110. Accordingly, holes injected from the pixel electrode 130 and electrons injected from the first touch electrode 10 are combined in the organic emission layer, thereby forming excitons. Light having a specific wavelength is generated in each emission layer 110 by energy from the formed excitons.

The first touch electrode 10 may be electrically connected to each emission layer 110 of the pixels formed in at least one row.

For example, in the configuration of FIG. 1, one first touch electrode 10 is electrically connected to each emission layer 110 of pixels formed in two neighboring rows.

In this case, the pixel P may normally emit light during a period in which the first voltage ELVSS is applied to the first touch electrode 10.

However, the voltage of the first touch electrode 10 is frequently changed during a period in which the touch driving signal Tx is applied to the touch electrode 10, and therefore, the pixel P may be maintained in a non-emission state during the period in which the touch driving signal Tx is applied.

The first and second touch electrodes 10 and 20 are necessarily spaced apart from each other at a predetermined distance. To this end, an insulating member 260 may be formed therebetween.

When the insulating member 260 is formed on the first touch electrode 10 as shown in FIG. 4, the second touch electrode 20 is formed on a top surface of the insulating member 260.

In addition, it will be apparent that the insulating member 260 may be formed as a single- or multi-layered structure.

Alternatively, the insulating member 260 may be formed spaced apart from the first touch electrode 10. In these configurations, the second touch electrode 20 is formed on a bottom surface of the insulating layer 260.

Figure 5:
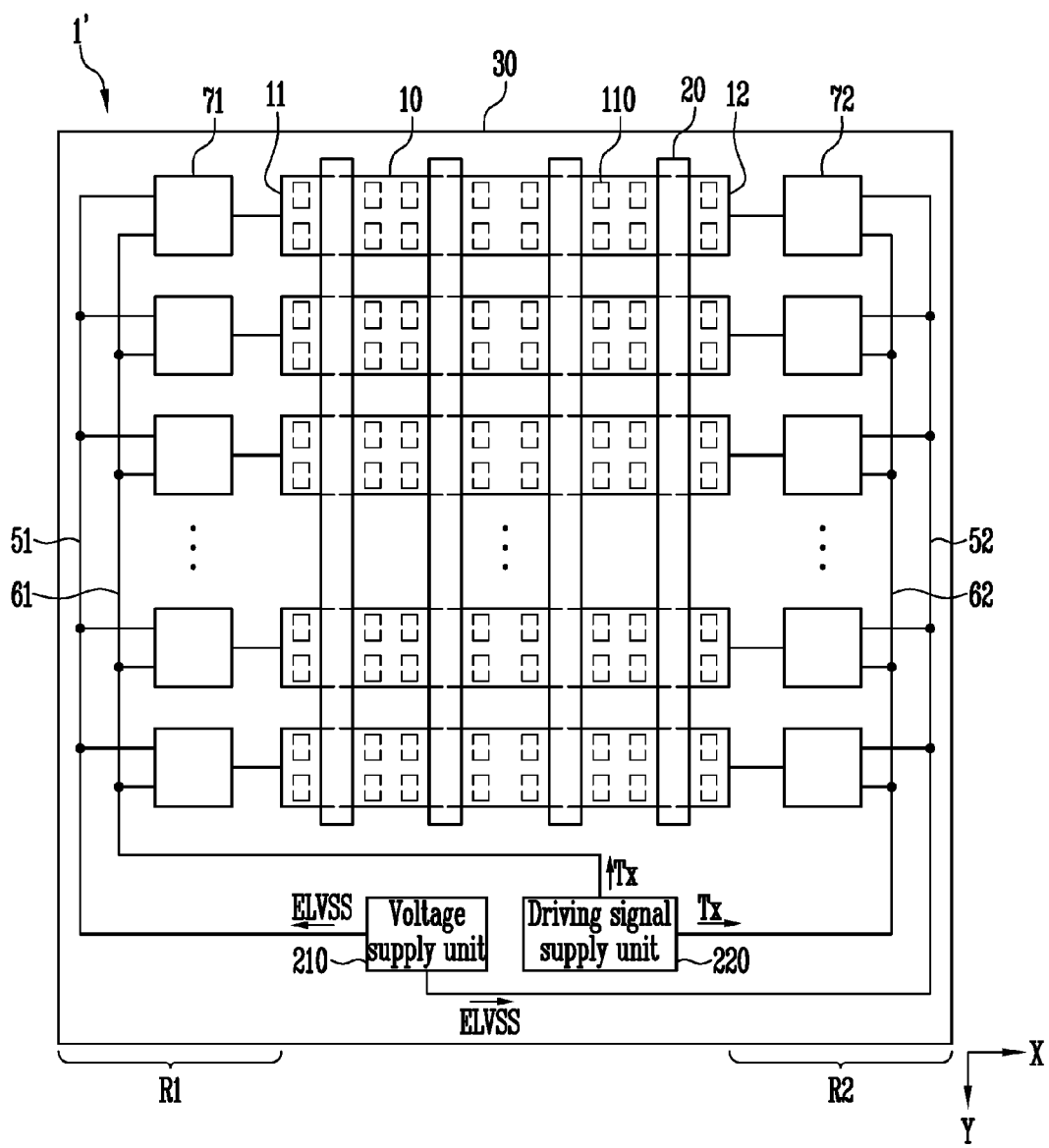
FIG. 5 is a view illustrating a touch screen display according to another embodiment.

FIG. 5 is a view illustrating a touch screen display according to another embodiment.

Hereinafter, the touch screen display 1' will be described with reference to FIG. 5 and descriptions similar to those of the aforementioned embodiment will be omitted.

Referring to FIG. 5, the touch screen display 1' may further include a second voltage line 52, a second signal line 62 and a second switching unit 72.

The second voltage line 52 is formed in the other region R2 adjacent to the first touch electrode 10.

In the configuration of FIG. 5, the second voltage line 52 provides the first voltage ELVSS to the second switching unit 72.

To this end, like the first voltage line 51, the second voltage line 52 is electrically connected to the voltage supply unit 210 and receives the first voltage ELVSS from the voltage supply unit 210.

The second signal line 62 may be formed in the other region R2 together with the second voltage line 52.

To this end, like the first signal line 61, the second signal line 62 is electrically connected to the driving signal supply unit 220 and receives the touch driving signal Tx from the driving signal supply unit 220.

The second switching unit 72 is connected to the second voltage line 52 and the second signal line 62 and alternately applies the first voltage ELVSS and the touch driving signal Tx to the other end or a second end 12 of each first touch electrode 10.

The other end of each first touch electrode 10 is adjacent to the other region R2 in which the second voltage line 52 and the second signal line 62 are formed.

The second switching unit 72 may be formed in the other region R2 of the first touch electrode 10. For example, the second switching unit 72 may be formed between the lines 52 and 62 and the first touch electrode 10.

In the configuration of FIG. 5, the first and second switching units 71 and 72 connected to the same first touch electrode 10 supply the touch driving signal Tx at substantially the same time and supply the first voltage ELVSS at substantially the same time.

Figure 6:
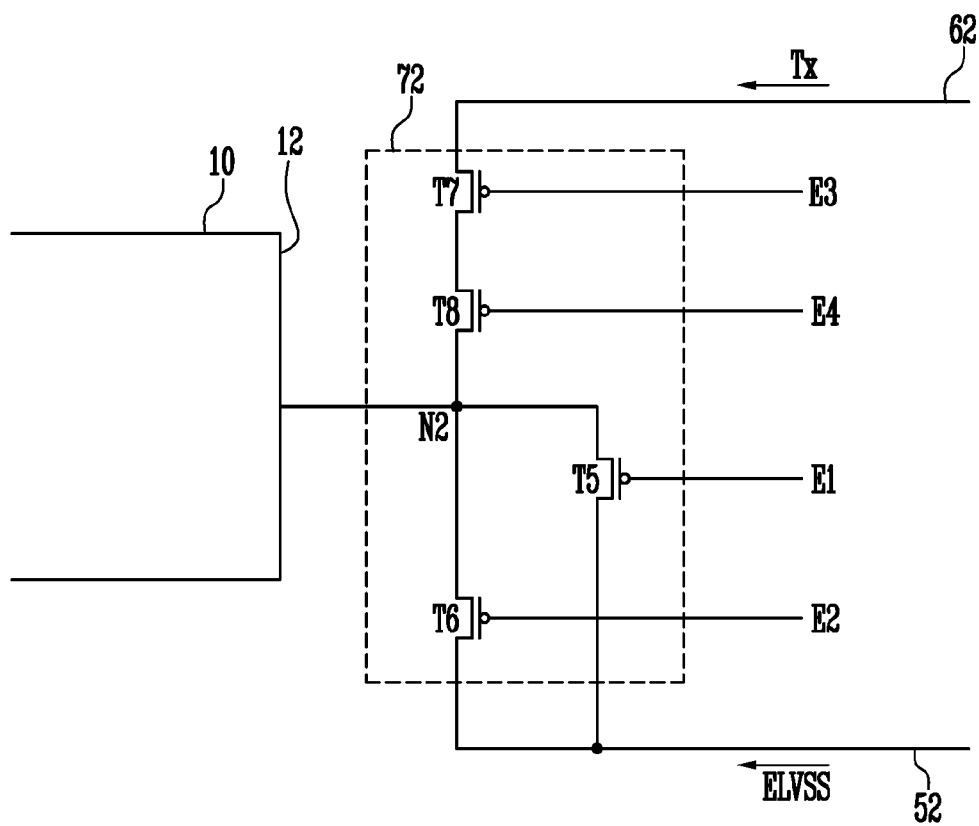
FIG. 6 is a view illustrating a second switching unit shown in FIG. 5.

FIG. 6 is a view illustrating the second switching unit shown in FIG. 5.

Referring to FIG. 6, the second switching unit 72 includes a second output node N2, a fifth transistor T5, a sixth transistor T6, a seventh transistor T7 and an eighth transistor T8.

The second output node N2 is electrically connected to the other end 12 of the first touch electrode 10.

The fifth and sixth transistors T5 and T6 are connected in parallel between the second output node N2 and the second voltage line 52.

In the configuration of FIG. 6, the fifth transistor T5 is controlled by the first control signal E1 and the sixth transistor T6 is controlled by the second control signal E2.

Thus, the fifth transistor T5 can be controlled identically to the first transistor T1 of the first switching unit 71. The sixth transistor T6 can be controlled identically to the second transistor T2 of the first switching unit 71.

A first electrode of the fifth transistor T5 is connected to the second output node N2 and a second electrode of the fifth transistor T5 is connected to the second voltage line 52. The first control signal E1 is supplied to a gate electrode of the fifth transistor T5.

The seventh and eighth transistors T7 and T8 are connected in series between the second signal line 62 and the second output node N2.

The seventh transistor T7 is controlled by the third control signal E3 and the eighth transistor T8 is controlled by the fourth control signal E4.

Thus, the seventh transistor T7 can be controlled identically to the third transistor T3 of the first switching unit 71 and the eighth transistor T8 can be controlled identically to the fourth transistor T4 of the first switching unit 71.

A first electrode of the seventh transistor T7 is connected to the second signal line 62 and a second electrode of the seventh transistor T7 is connected to the eighth transistor T8. The third control signal E3 is supplied to a gate electrode of the seventh transistor T7.

A first electrode of the eighth transistor T8 is connected to the seventh transistor T7 and a second electrode of the eighth transistor T8 is connected to the second output node N2. The fourth control signal E4 is supplied to a gate electrode of the eighth transistor T8.

The circuit structure of the second switching unit 72 is identical to that of the first switching unit 71 and the control signals of the second switching unit 72 are also identical to that of the first switching unit 71. Thus, the second switching unit 72 can be operated identically to the first switching unit 71.

For example, the second switching unit 72 may supply the first voltage ELVSS to the first touch electrode 10 during the first, second and fourth periods P1, P2 and P4. The second switching unit 72 may supply the touch driving signal Tx to the first touch electrode 10 during the third period P3.

By way of summation and review, the related art capacitive touch sensor may be configured with a plurality of first touch electrodes receiving a touch driving signal and a plurality of second touch electrodes outputting a change in capacitance.

In this case, the related art touch sensor requires a plurality of lines for supplying the touch driving signal to each first touch electrode, and accordingly, there is more dead space in the touch sensor of the related art.

As described above, according to at least one embodiment, it is possible to provide a touch screen display including a switching unit for providing a touch driving signal to a first touch electrode, thereby decreasing the number of lines for providing the touch driving signal.

Exemplary embodiments have been disclosed herein, and although specific terms have been employed, they are used and are to be interpreted in a generic and descriptive sense only and not for the purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A touch screen display, comprising:
a plurality of first touch electrodes each including first and second ends opposing each other in a first direction;
a plurality of second touch electrodes crossing the first touch electrodes;
a first voltage line configured to provide a voltage;
a first signal line configured to provide a touch driving signal; and
a plurality of first switching units respectively connected to the first touch electrodes,
wherein each of the first switching units is electrically connected to i) the first voltage line, ii) the first signal line, and iii) the first end of a corresponding first touch electrode,
wherein each of the first switching units is configured to alternately provide one of the voltage and the touch driving signal to the corresponding first touch electrode, and
wherein each of the first switching units comprises:
a first output node connected to the first end of the corresponding first touch electrode;
first and second transistors connected in parallel between the first output node and the first voltage line; and
third and fourth transistors connected in series between the first signal line and the first output node.

2. The touch screen display of claim 1, further comprising first to fourth control signals respectively configured to control the first to fourth transistors.

3. The touch screen display of claim 2, wherein the first and third control signals have a mutually inverse relationship and wherein the second and fourth control signals have a mutually inverse relationship.

4. The touch screen display of claim 1, wherein each of the first switching units is configured to apply i) the voltage to the first touch electrode during first, second, and fourth periods, and ii) the touch driving signal to the first touch electrode during a third period.

5. The touch screen display of claim 4, wherein the first and second transistors are configured to be turned on and the third and fourth transistors are configured to be turned off during the first period, wherein the second and third transistors are configured to be turned on and the first and fourth transistors are configured to be turned off during the second period, wherein the third and fourth transistors are configured to be turned on and the first and second transistors are configured to be turned off during the third period, and wherein the first and fourth transistors are configured to be turned on and the second and third transistors are configured to be turned off during the fourth period.

6. The touch screen display of claim 1, wherein the first voltage line and the first signal line are formed in a first region adjacent to the first ends of each of the first touch electrodes along the first direction.

7. The touch screen display of claim 1, further comprising:
a second voltage line configured to provide the voltage;
a second signal line configured to provide the touch driving signal; and
a plurality of second switching units respectively connected to the first touch electrodes, wherein each of the second switching units is electrically connected to i) the second voltage line, ii) the second signal line, and ii) the second end of the corresponding first touch electrode, wherein each of the second switching units is configured to alternately provide one of the voltage and the touch driving signal to the corresponding first touch electrode.

8. The touch screen display of claim 7, wherein each of the second switching units includes:
a second output node connected to the second end of the corresponding first touch electrode;
fifth and sixth transistors connected in parallel between the second output node and the second voltage line; and
seventh and eighth transistors connected in series between the second signal line and the second output node.

9. The touch screen display of claim 8, wherein the first to fourth control signals are respectively configured to control the fifth to eighth transistors.

10. The touch screen display of claim 7, wherein the second voltage line, the second signal line, and the second switching units are formed in a second region adjacent to the second ends of the first touch electrodes.

11. The touch screen display of claim 7, wherein each of the first and second switching units connected to the same first touch electrode is configured to provide i) the first voltage at substantially the same time and ii) the first touch driving signal at substantially the same time.

12. The touch screen display of claim 1, further comprising a plurality of pixels arranged in a plurality of rows, wherein each pixel comprises an emission layer and wherein each of the first touch electrodes is connected to the emission layer of each of the pixels arranged in the same row.

13. The touch screen display of claim 1, wherein the first and second touch electrodes are formed at least partially of a transparent conductive material.

14. A touch screen display, comprising:
a plurality of pixels arranged in a plurality of rows;
a plurality of first touch electrodes each formed over the pixels in at least one row, wherein each of the first touch electrodes comprises first and second ends opposing each other in a first direction;
a plurality of second touch electrodes crossing the first touch electrodes; and
a plurality of first switches respectively electrically connected to the first touch electrodes, each first switch configured to alternately apply one of a voltage and a touch driving signal to a corresponding first touch electrode, wherein each of the first switches comprises:
- a first output node connected to the first end of the corresponding first touch electrode;
- first and second transistors connected in parallel between the first output node and the first voltage line; and
- third and fourth transistors connected in series between the first signal line and the first output node.

15. The touch screen display of claim 14, further comprising a plurality of second switches respectively electrically connected to the first touch electrodes, wherein each of the second switched is configured to alternately apply one of the voltage and the touch driving signal to the corresponding first touch electrode.

16. The touch screen display of claim 14, further comprising:
- a voltage line configured to provide the voltage; and
- a signal line configured to provide the touch driving signal,
- wherein each of the first switches is connected to the voltage line and the signal line.

17. A touch screen display, comprising:
- a plurality of touch electrodes each including first and second ends opposing each other in a first direction; and
- a plurality of first switches respectively electrically connected to the first ends of the touch electrodes,
- wherein each of the first switches is configured to alternately apply one of a voltage and a touch driving signal to a corresponding touch electrode, and
- wherein each of the first switches comprises:
  - a first output node connected to the first end of the corresponding first touch electrode;
  - first and second transistors connected in parallel between the first output node and the first voltage line; and
  - third and fourth transistors connected in series between the first signal line and the first output node.

18. The touch screen display of claim 17, further comprising a plurality of second switches respectively electrically connected to the second ends of the touch electrodes, wherein each of the second switched is configured to alternately apply one of the voltage and the touch driving signal to the corresponding touch electrode.

19. The touch screen display of claim 18, wherein each of the first and second switches connected to the same touch electrode is configured to provide i) the voltage at substantially the same time and ii) the touch driving signal at substantially the same time.

* * * * *